(12) United States Patent
Garroff et al.

(10) Patent No.: US 8,546,499 B2
(45) Date of Patent: Oct. 1, 2013

(54) LINEAR LOW DENSITY POLYETHYLENE WITH UNIFORM OR REVERSED COMONOMER COMPOSITION DISTRIBUTION

(75) Inventors: Thomas Garroff, Helsinki (FI); Paivi Waldvogel, Porvoo (FI); Kallio Kalle, Porvoo (FI); Virginie Eriksson, Stenungsund (SE); Aki Aittola, Vasterskog (FI); Esa Kokko, Vantaa (FI)

(73) Assignee: Borealis AG, Vienna (AT)

( * ) Notice: Subject to any disclaimer, the term of this patent is extended or adjusted under 35 U.S.C. 154(b) by 0 days.

(21) Appl. No.: 13/318,101

(22) PCT Filed: Apr. 26, 2010

(86) PCT No.: PCT/EP2010/055519
§ 371 (c)(1),
(2), (4) Date: Oct. 28, 2011

(87) PCT Pub. No.: WO2010/125022
PCT Pub. Date: Nov. 4, 2010

(65) Prior Publication Data
US 2012/0053308 A1    Mar. 1, 2012

(30) Foreign Application Priority Data
Apr. 30, 2009 (EP) .................................... 09159144

(51) Int. Cl.
*C08F 4/44* (2006.01)

(52) U.S. Cl.
USPC ............................................... 526/124.7

(58) Field of Classification Search
USPC ...................................................... 526/124.7
See application file for complete search history.

(56) References Cited

U.S. PATENT DOCUMENTS

| | | | |
|---|---|---|---|
| 3,242,150 A | 3/1966 | Scoggin | |
| 3,324,093 A | 6/1967 | Alleman | |
| 3,374,211 A | 3/1968 | Marwil et al. | |
| 3,405,109 A | 10/1968 | Rohlfing | |
| 4,218,339 A | 8/1980 | Zucchini et al. | |
| 4,582,816 A | 4/1986 | Miro | |
| 5,391,654 A | 2/1995 | Ahvenainen et al. | |
| 6,034,026 A | 3/2000 | Garoff et al. | |
| 6,469,103 B1 | 10/2002 | Jain et al. | |
| 6,620,758 B1 * | 9/2003 | Lindroos et al. ............. | 502/110 |
| 6,632,680 B1 | 10/2003 | DesLauriers et al. | |
| 2007/0032618 A1 | 2/2007 | Varzeshkhah et al. | |

FOREIGN PATENT DOCUMENTS

| | | |
|---|---|---|
| CA | 1795213 A | 6/2006 |
| EP | 0155682 A2 | 9/1985 |
| EP | 0435557 A2 | 7/1991 |
| EP | 0479186 A2 | 4/1992 |
| EP | 0517868 | 7/1992 |
| EP | 0688794 A1 | 12/1995 |
| EP | 0835887 A2 | 4/1998 |
| EP | 0887379 A1 | 12/1998 |
| EP | 0891990 A2 | 1/1999 |
| EP | 1310295 A1 | 5/2003 |
| EP | 1415999 A1 | 5/2004 |
| EP | 1481994 A1 | 12/2004 |
| EP | 1591460 A1 | 11/2005 |
| EP | 1860125 A1 | 11/2007 |
| KR | 20060015516 A | 2/2006 |
| WO | 95/25758 | 9/1995 |
| WO | 01/55230 A1 | 8/2001 |
| WO | 03/055921 A1 | 7/2003 |
| WO | 2004/050722 A1 | 6/2004 |
| WO | 2006/103172 A1 | 10/2006 |

OTHER PUBLICATIONS

C. Li Pi Shan et al., "Mechanical properties of ethylene/1-hexene copolymers with tailored short chain branching distributions", Polymer 43, 2002, pp. 767-773.

Paul J. Deslauriers et al., "Quantifying short chain branching microstructures in ethylene 1-olefin copolymers using size exclusion chromatography and Fourier transform infrared spectroscopy (SEC-FTIR)", Polymer 43, 2002 pp. 159-170.

Benjamin Monrabal, "Crystallization Analysis Fractionation: A New Technique for the Analysis of Branching Distribution in Polyolefins", Journal of Applied Polymer Science, 1994, vol. 52, pp. 491-499.

Joao B. P. Soares, "Fractionation", Encyclopedia of Polymer Science and Technology, vol. 10, pp. 75-131, John Wiley & Sons, New York.

L. Wild, "Determination of Branching Distributions in Polyethylene and Ethylene Copolymers", Journal of Polymer Science: Polymer Physics Edition, 1982, vol. 20, pp. 441-455.

TREF curve of copolymer produced after 37 min with TEAL compared to TREF curve of copolymer produced after 30 min with TEAL/EADC Chung C. Tso, "Comparison of methods for characterizing comonomer composition in ethylene 1-olefin copolymersL 3D-TREF vs. SEC-FTIR" 2004, Polymer, vol. 45 pp. 2657-2663.

P. J. Deslauriers, "Measuring Compositional Heterogeneity in Polyolefins Using Size-Exclusion Chromatography/Fourier Transform Infrared Spectroscopy" Multiple Detection in Size-exclusion Chromatography, American Chemical Society, pp. 210-229, 2005.

International Search Report and Written Opinion for International Application No. PCT/EP2010/055519.

* cited by examiner

*Primary Examiner* — Ling Choi
*Assistant Examiner* — Catherine S Branch
(74) *Attorney, Agent, or Firm* — Roberts Mlotkowski Safran & Cole, P.C.

(57) ABSTRACT

Ziegler-Natta catalyzed linear low density polyethylene which satisfies the following conditions:
a) a density, according to ISO 1183, of from 900 to 925 kg/m$^3$,
b) a $C_4$-$C_{10}$-comonomer content, determined by Fourier transform infrared spectroscopy, of 1 to 16 wt %
c) a weight average molecular weight Mw, determined by gel permeation chromatography, of at least 200 000,
d) wherein the linear low density polyethylene comprises, by Crystallisation Analysis Fractionation (CRYSTAF) an amorphous fraction soluble at a temperature below 30° C. of at most 10 wt % and a fraction crystallising between 60 to 75° C. of at least 35 wt % and
e) by temperature rising elution fractionation (TREF) analysis, at least 70 wt % of a crystallising polymer component having an elution temperature range from 60° C. to 94° C. and less than 10 wt % of a crystallising polymer component having an elution temperature range from 30° C. to 60° C. and,
f) by Gel Permeation chromatography coupled with Fourier transform infrared spectroscopy detector (GPC-FTIR), a substantially constant short chain branching profile across the molecular weight distribution (MWD) or
g) by Gel Permeation chromatography coupled with Fourier transform infrared spectroscopy instruments (GPC-FTIR), a reverse short chain branching profile across the molecular weight distribution (MWD),
the linear low density polyethylene being produced in the presence of a special Ziegler-Natta procatalyst and a halogenated aluminium alkyl cocatalyst of the formula (IV) ($C_1$-$C_4$-alkyl)$_m$-Al-$X_{3-m}$, wherein X is chlorine, bromine, iodine or fluorine and m is 1 or 2.

11 Claims, 6 Drawing Sheets

Figure 1: TREF curve of copolymer produced after 37 min with TEAL compared to TREF curve of copolymer produced after 30 min with TEAL/EADC
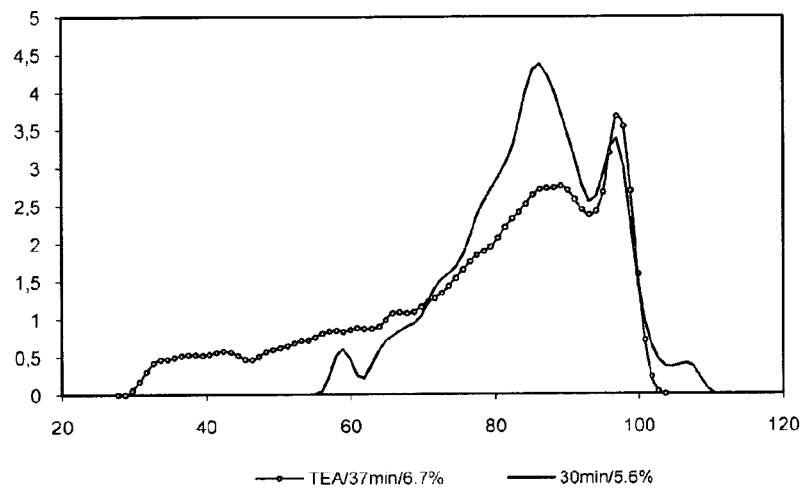
Figure 2: TREF curve of copolymer produced after 90 min with DEAC
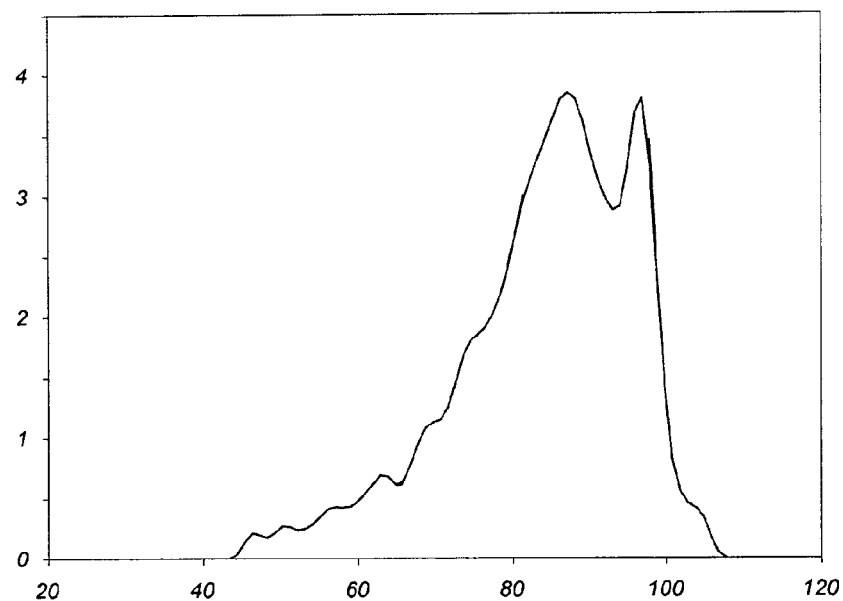

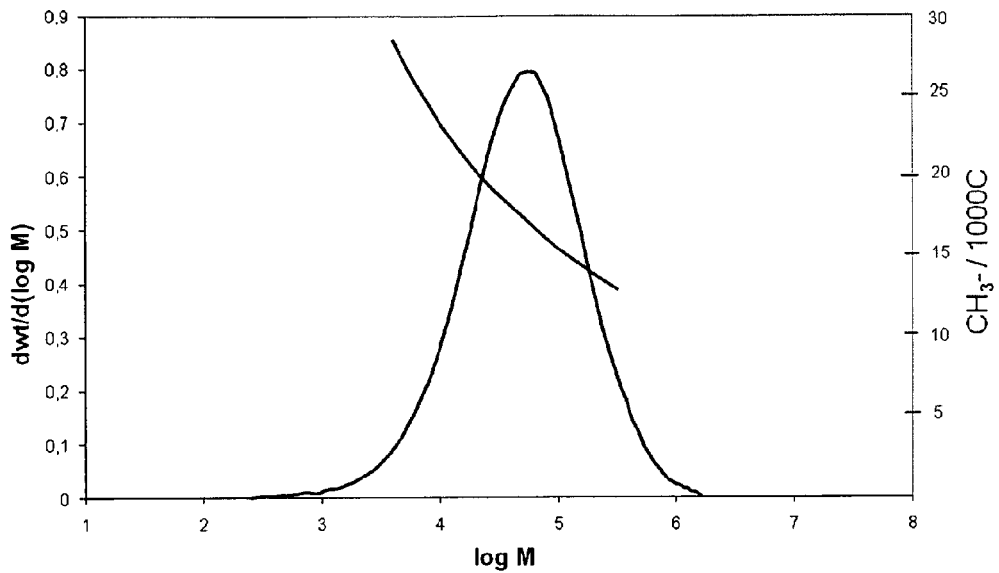
Figures 3a: GPC-FTIR: TEA as cocatalyst, after 15 min
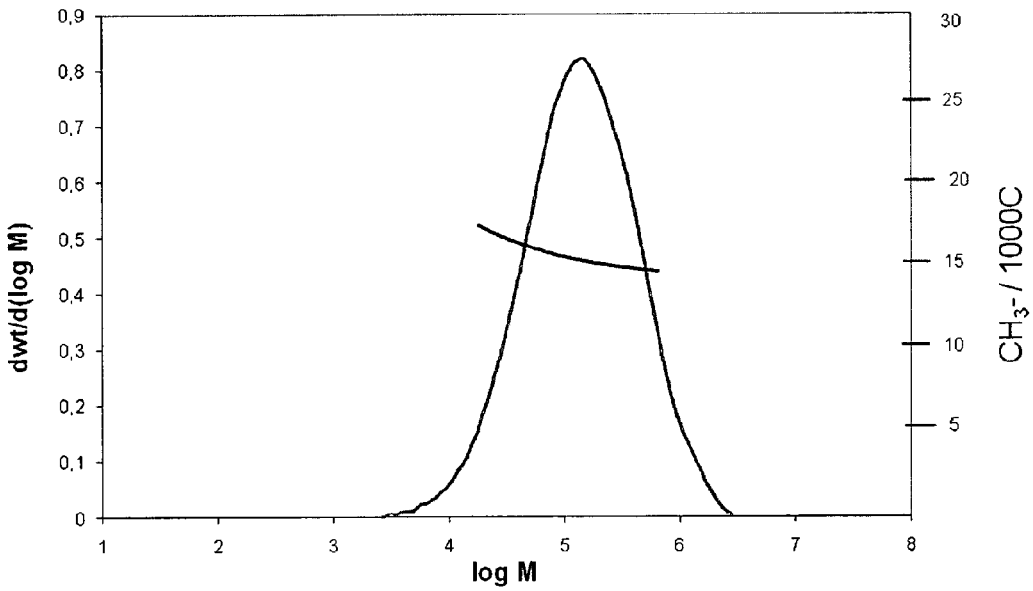
Figure 3b: GPC-FTIR: DEAC as cocatalyst, after 15 min

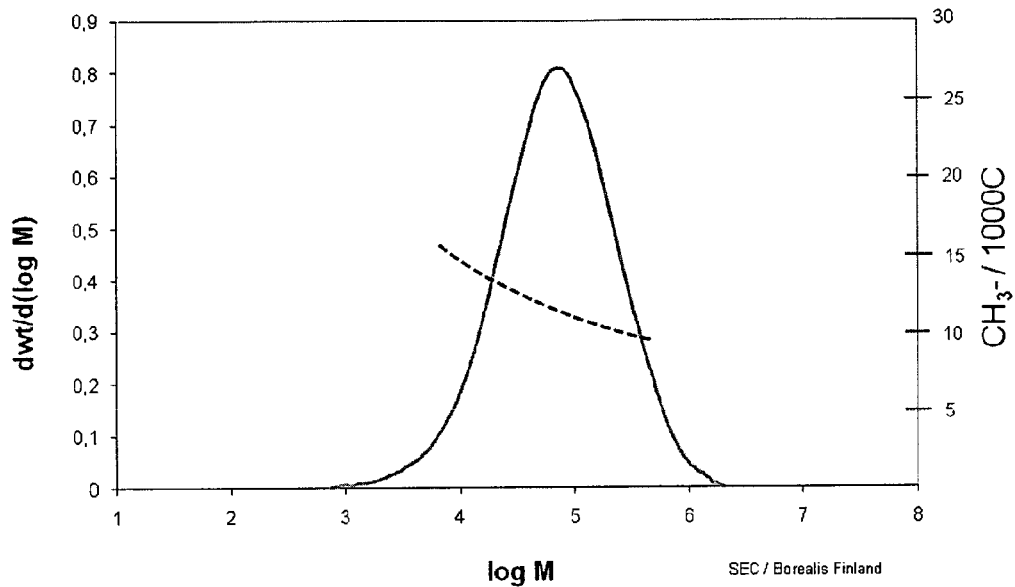
Figure 4a: GPC-FTIR: TEA as cocatalyst, after 60 min
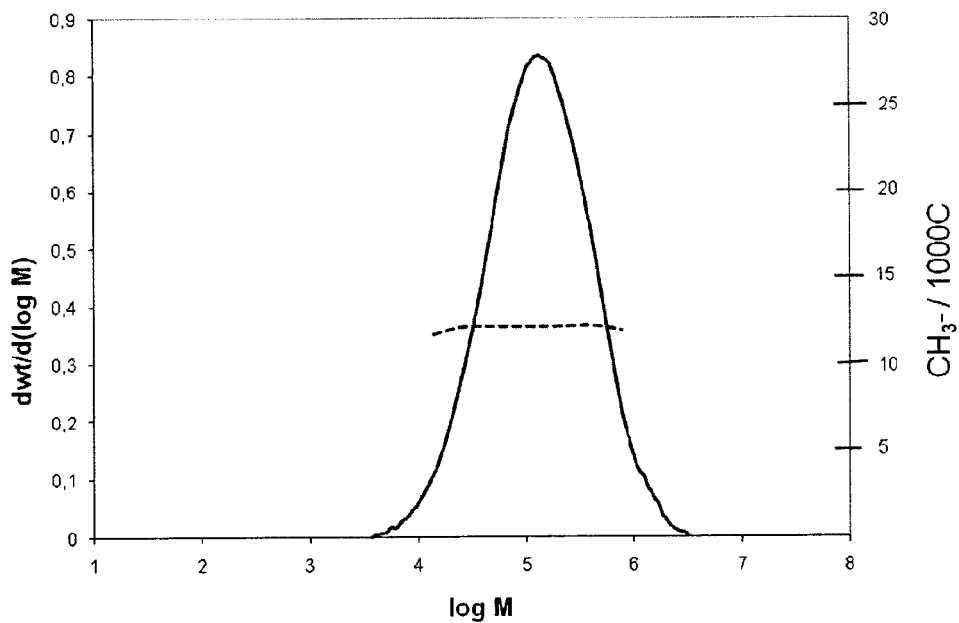
Figure 4b: GPC-FTIR: DEAC as cocatalyst, after 60 min

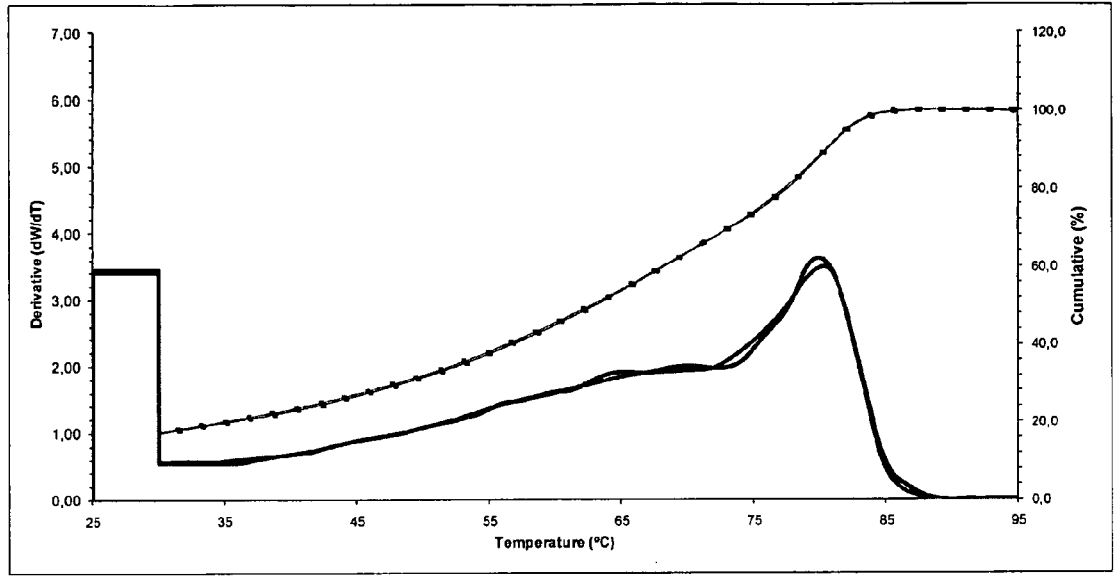
Figure 5a: Crystaf curve when TEA was used as a co-catalysts in 15 min polymerisation
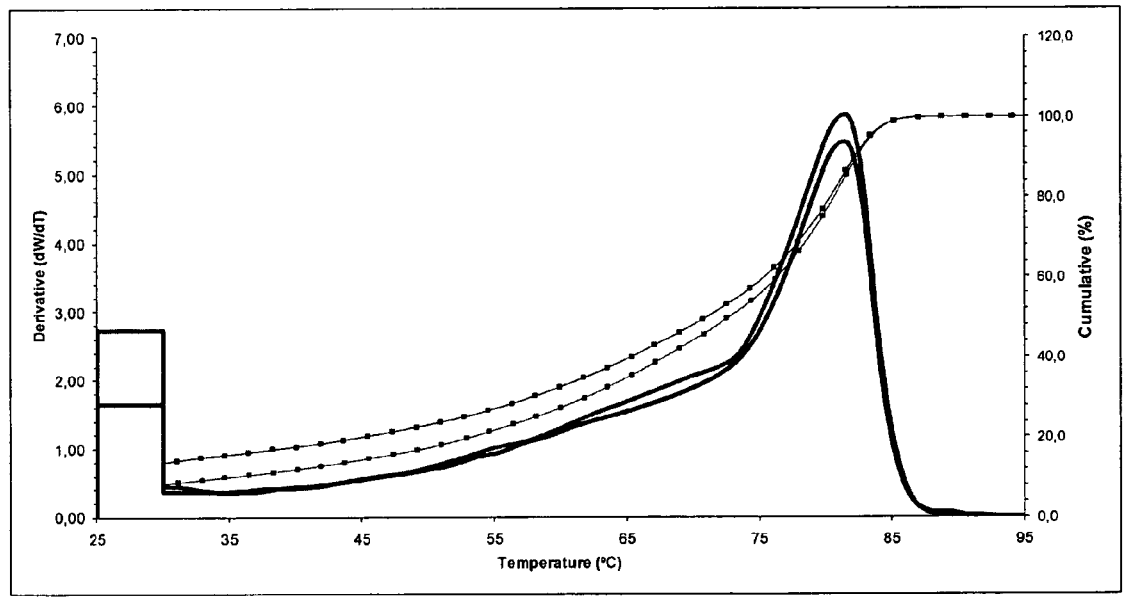
Figure 5b: Crystaf curve when TEA was used as a co-catalysts in 60 min polymerisation

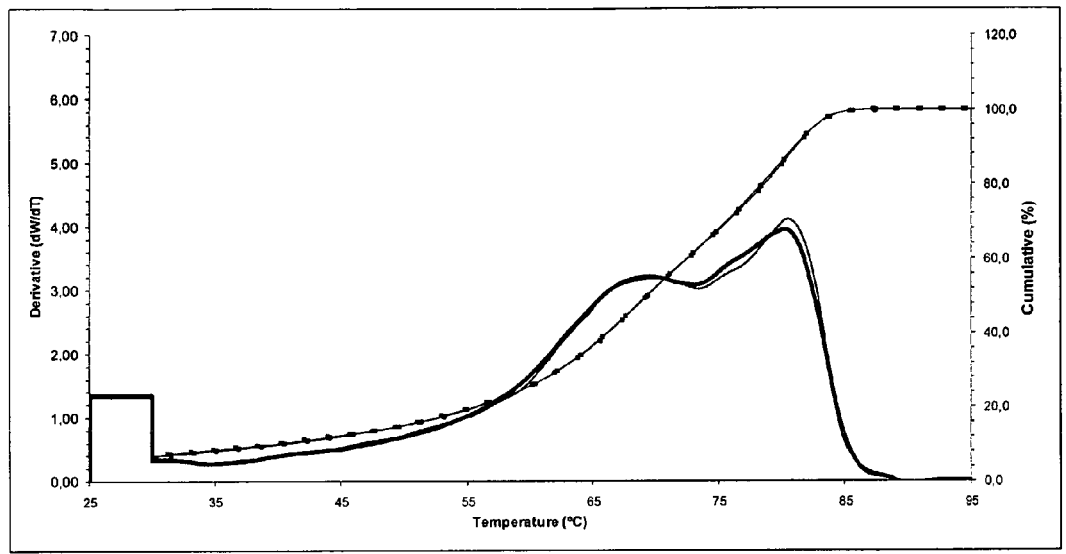
Figure 5c: Crystaf curve when DEAC was used as a co-catalysts in 15 min polymerisation
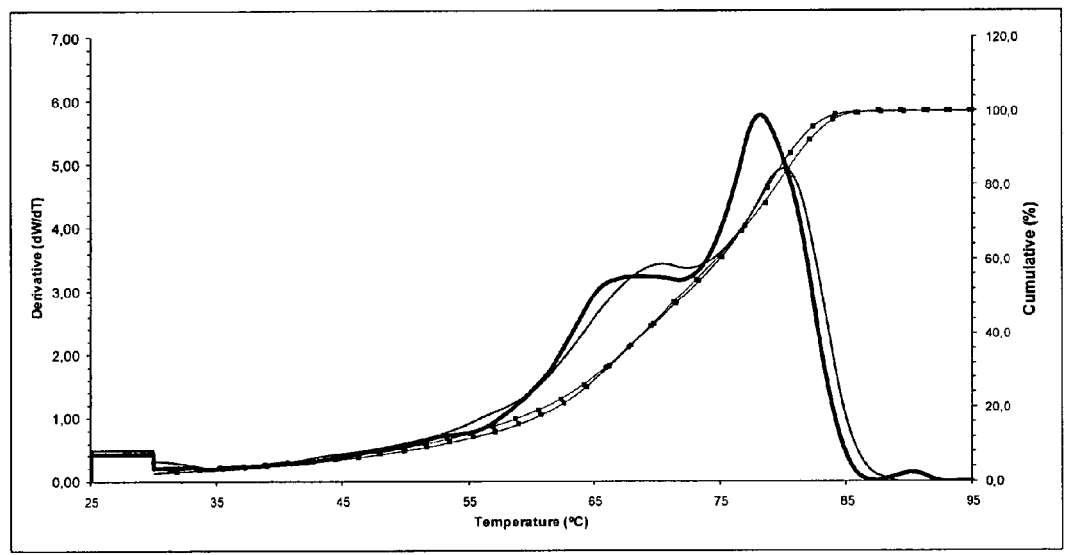
Figure 5d: Crystaf curve when DEAC was used as a co-catalysts in 60 min polymerisation

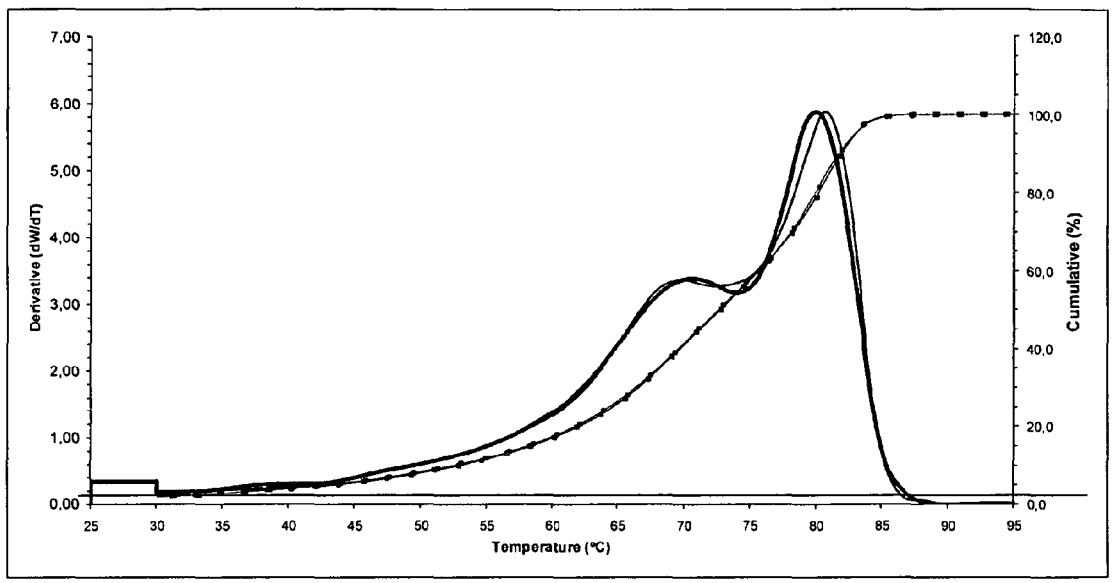
Figure 5e: Crystaf curve when DEAC was used as a co-catalysts in 180 min polymerisation

LINEAR LOW DENSITY POLYETHYLENE WITH UNIFORM OR REVERSED COMONOMER COMPOSITION DISTRIBUTION

The invention relates to linear low density polyethylene with uniform or reversed comonomer composition distribution.

More specifically, the present invention relates to linear low density polyethylene with a high degree of homogeneity in respect to comonomer incorporation, which is obtainable by copolymerization of ethylene with $C_4$- to $C_{10}$-alpha-olefins in the presence of a special Ziegler-Natta catalyst composition comprising a mixture containing a group 13 metal, chlorine, magnesium and titanium atoms, supported on a particulate inorganic carrier and a halogenated aluminium alkyl as cocatalyst.

Ethylene, alone or with other olefinic unsaturated monomers are frequently polymerized in the presence of catalyst compositions, which have essentially two components: a compound of a transition metal belonging to any of groups 4 to 6 of the Periodic Table of Elements (IUPAC 2007) which is often called a procatalyst, and a compound of a metal belonging to groups 1, 2 or 13 of said Table which is the s.c. cocatalyst. This kind of Ziegler-Natta catalyst composition has been further developed by depositing the procatalyst on a less or more inert and particulate support and by adding to the catalyst composition in the stages of its preparation several additives, among others electron donating compounds.

The catalyst composition used for the production of the ethylene (co-)polymers determines i.a. the properties of the polymers. Thus, the catalyst composition allows for a "tailoring" of the properties of the produced resins.

It is furthermore known that polyethylene can be modified by the addition, during the polymerization reaction, of small quantities of alpha-olefins, generally 1-butene, 1-hexene or 1-octene.

This gives LLDPE (linear low density polyethylene) copolymers which have short branches along the main chain due to the units derived from the alpha-olefin comonomers. These branches have the effect that the degree of crystallinity and hence the density of the copolymer turn out to be lower than in the polyethylene homopolymer.

The problem in the copolymerization of ethylene with $C_4$- to $C_{10}$-alpha-olefins in the presence of conventional types of Ziegler-Natta catalyst compositions is, that the comonomers tend to be irregularly distributed over the molecule chains yielding copolymers with uneven or poor comonomer composition distribution (CCD), which can be detected for example by TREF (Temperature Rising Elution Fractionation) method, Differential Scanning calorimetry (DSC), GPC-FTIR (Gel Permeation Chromatography using an Fourier transform infrared spectroscopy detector) or measuring the amount of CRYSTAF (Crystallisation Analysis Fractionation) soluble polymer fraction.

The distribution of the alpha-olefin comonomer units, respectively of the branches along the polymer chain, in the ethylene copolymer is crucial because it influences the properties of the copolymer resin which, in turn, determine its applicability for commercial products.

In particular, the greater uniformity of the distribution of the branches has a positive effect on the properties of the copolymers. In fact, with the same type and quantity of incorporated alpha-olefin, a higher uniformity of distribution allows lower degrees of crystallinity and density to be obtained.

The concrete result of such co-polymerizations using conventional types of Ziegler-Natta catalyst compositions is a mixture containing polyethylene qualities with various densities. In heat-fractioning by means of a TREF analyser, high-density (HDPE), linear low-density (LLDPE) and very low-density (VLDPE) polyethylene are distinguished in the product.

As a consequence of the uneven comonomer distribution, conventional olefin copolymers e.g. have a comparatively high degree of room temperature soluble fraction which is undesirable in many applications. This soluble fraction (SF) can be identified by XS (xylene soluble), by SF CRYSTAF (1,2,4-trichlorobenzene soluble) or by SF $TREF_{[s1]}$ (1,2,4-trichlorobenzene soluble). Too high soluble fraction can cause taste and odour problems for example in food packaging and water pipes. Such soluble fraction is also causing smoking and smelling during processing of the resin (for example during extrusion or film blowing).

Optimizing the properties of LLDPE by varying product molecular weight, polydispersity index (PDI=Mw/Mn) and density is performed to match the required product specifications. Narrowing the PDI, lowering the density of LLDPE, improving branching, respectively comonomer compositional distribution and reducing low molecular weight extractable fraction are desirable as the tear strength, impact strength, puncture resistance, toughness, and clarity properties of films from these resins can be much improved. Although the actual molecular weight of a resin can be adjusted by altering process conditions in copolymerization reactions, PDI, density, comonomer composition distribution and low molecular weight extractable fraction of a LLDPE resin are strongly influenced by catalyst composition, as already stated above.

The use of catalysts based on metallocene compounds has made it possible to obtain LLDPE copolymers having an improved uniformity of composition. These copolymers, of the same chemical composition, are endowed with superior properties as compared with traditional copolymers. Such single site catalyst systems, employing organometallic compounds and aluminoxane, can provide improved control of PDI and branching compositional distributions compared to traditional Ziegler-Natta catalyst systems.

However, the solubility of organometallic compounds and cocatalysts such as methylaluminoxane (MAO) requires immobilization processes on inorganic supports in systems that are costly. Accordingly, it can be difficult to apply single site catalysts in existing polymerization processes without major process modification and capital investments. So the application of such systems for producing LLDPE has its drawbacks.

The copolymers obtained with metallocene catalysts have in addition poor processability properties and this can be disadvantageous in particular in some applications, such as the use for films.

Therefore various Ziegler-Natta catalyst compositions have already been examined to manufacture LLDPE trying to achieve better comonomer incorporation and improved comonomer composition distribution.

EP 0 155 682 discloses catalyst components comprising a) an Al-alkyl compound as cocatalyst, b) an external donor containing at least a nitrogen atom and c) a solid procatalyst comprising a titanium compound supported on an anhydrous magnesium halide, which are suitable for the preparation of LLDPE polymers. Comparing the Examples it can be clearly seen that said catalyst components are endowed with a good capability of producing polymers with narrow PDI and with a good capability of distributing comonomer only when specific nitrogen containing external donors are used together with an aluminium trialkyl. The presence of nitrogen containing external donor has two negative effects: it may decrease the activity of the catalyst and increases the cost of the catalyst. No mention is made of the possibility of using a halogenated aluminium alkyl as cocatalyst.

WO 03/055921 discloses catalyst components for the polymerization of olefins that are particularly suitable for the preparation of LLDPE polymers which comprise (I) a solid pro-catalyst comprising Mg, Ti, Cl, and OR groups, where R is a $C_1$-$C_{10}$-alkyl group optionally containing heteroatoms, in which the Ti/Mg weight ratio is from 2 to 6.5, the Cl/Ti weight ratio is from 1.5 to 3.5 and the OR/Ti weight ratio is from 0.7 to 2.5 and at least 50% of the titanium atoms are in a valence state lower than 4 and (II) an alkyl aluminium halide as cocatalyst. The alkyl aluminium halide is suitably selected among alkyl aluminium chlorides and in particular among diethyl aluminium chloride, diisobutyl aluminium chloride, Al-sesquichloride and dimethyl aluminium chloride. Dimethyl aluminium chloride is especially preferred.

The solid procatalyst (I) can be prepared according to the general disclosure of U.S. Pat. No. 4,218,339 for example by reacting $MgCl_2$, $Ti(OBu)_4$, polymethylhydrosiloxane and $SiCl_4$. According to WO 03/055921 such catalyst components allow the preparation of ethylene copolymers with a low content of xylene soluble fractions. According to the Examples this content is still 8.8 wt % to 11.5 wt %.

EP 0 435 557 discloses an olefin polymerization catalyst composition which is prepared by a) contacting a solution of a magnesium compound, such as $MgCl_2$, in an electron donor compound, preferably tetrahydrofuran, with a titanium compound, b) contacting the solution resulting from step a) with a solid, inert porous carrier to form a catalyst precursor and c) contacting the precursor with dimethyl aluminium chloride (DMAC). It is stated in EP 0 435 557 that the use of DMAC as the activator for the precursor composition instead of triethyl aluminium (TEAL), commonly used in alpha-olefin polymerization reactions, produces LLDPE having substantially more uniform distribution of side chain branches among the polymer molecules.

WO 2004/050722 describes a Ziegler-Natta catalyst system comprising a procatalyst which comprises an inorganic support, a magnesium compound, a titanium compound and optionally a chlorine compound on said support and a cocatalyst which is a mixture of at least two organometallic compounds of the formula $R_3Al$ where R can be the same or different and is a $C_1$ to $C_{20}$ alkyl group or isoprenyl group, said R optionally being substituted by one or more halogen or hetero atom.

Preferably the cocatalyst is a mixture of compounds selected from the group consisting of tri-$C_1$-$C_{10}$ alkyl aluminium compounds, where one of the components contains short-chained alkyl groups having 1-3 carbon atoms and the other component contains long-chained alkyl groups having 4-10 carbon atoms. According to WO 2004/050722 this system is capable to produce ethylene copolymers with a high degree of homogeneity and to control the molecular weight distribution of the polymer produced, at least in the case where one compound of the cocatalyst mixture is isoprenyl aluminium.

According to WO 95/25758 a Ziegler-Natta procatalyst, capable of producing ethylene copolymers, is activated with an cocatalyst comprising an organo-halogenous compound of a metal of group 2 or 13 of the Periodic Table of Elements (IUPAC 2007) which is prepared by reacting an organic compound of the metal of group 2 or 13 and a catalytically non-toxic halogen compound during copolymerization or not earlier than 3 hours before copolymerization.

The essential feature of the catalyst composition described in WO 95/25758 is the use of a "fresh" cocatalyst or even one prepared in situ during copolymerization in order to yield alpha-olefin comonomer distribution as regular as possible for the ethylene copolymer.

The cocatalyst is prepared by reacting a compound of the formula $R_nM$, preferably triethyl aluminium (TEAL) with the catalytically non-toxic halogen compound, preferably ethyl aluminium sesquichloride in situ during copolymerization or not earlier than 3 hours before copolymerization.

From Examples 6 to 8 of WO 95/25758 it can be seen that the "fresh" cocatalyst as claimed in WO 95/25758, prepared 30 minutes before use in the polymerization of an ethylene/1-hexene copolymer, yields the highest and narrowest peak in the area of linear low-density polyethylene fraction. Furthermore it can be seen that as a matter of time, the proportion of detrimental, very low-density polyethylene fraction grows, the growth also appearing as a lower average density of the polymer product. This copolymer portion is apparently sticky and causes problems in the process and end product by effecting the mechanical properties.

Though the references cited above aim to resolve the problem of irregular comonomer distribution in ethylene copolymerization, the products still contain too great fractions of very low-density ethylene copolymer. Furthermore the Ziegler-Natta catalyst systems used according to the state of the art have still limitations in controlling PDI and short chain branching distribution (SCBD) respectively comonomer composition distribution.

As described in the literature, e.g. in Polymer 43 (2002) p. 767-773 or Polymer 45 (2004) p. 2657-2663, for Ziegler-Natta catalyzed resins it is typical that the comonomer content of the copolymer decreases as the molecular weight of the polymer chains increases, which leads to a downward comonomer content distribution profile across the molecular weight distribution (MWD).

Thus there is still further demand for development of linear low density polyethylene (LLDPE) showing a comonomer composition distribution profile across the MWD which is more constant, respectively flat, compared to state of the art LLDPEs, meaning that the comonomer content of the copolymer does substantially not decrease with increasing molecular weight (at least does not decrease in that extent known from prior art) or even showing an upward comonomer composition content distribution profile across the MWD which stands for reverse comonomer incorporation, meaning that the comonomer content of the copolymer increases as the molecular weight of the polymer chains increases. Such LLDPEs should further have lower fractions of very low-density ethylene copolymer.

It is therefore an object of the present invention to provide a linear low density polyethylene with improved properties, like molecular weight, comonomer composition distribution, amount of CRYSTAF soluble polymer fraction and density. Especially the object of the invention is to provide highly homogeneous ethylene copolymers, having an improved comonomer composition distribution, improved molecular weights of individual polymer fractions, comonomer contents in different polymer chains, side chain distribution in single polymer chains etc.

It has now surprisingly been found that this object is achieved by using a Ziegler-Natta catalyst composition comprising a special procatalyst containing a group 13 metal, chlorine, magnesium and titanium atoms, supported on a particulate inorganic carrier and a halogenated aluminium alkyl as cocatalyst for the production of the LLDPE according to the invention.

Therefore, the present invention provides a Ziegler-Natta catalyzed linear low density polyethylene which satisfies the following conditions:
a) a density, according to ISO 1183, of from 900 to 925 kg/m$^3$,
b) a $C_4$-$C_{10}$-comonomer content, determined by Fourier transform infrared spectroscopy, of 1 to 16 wt %,
c) a weight average molecular weight Mw, determined by gel permeation chromatography, of at least 200 000 g/mol,
d) wherein the linear low density polyethylene comprises, by Crystallisation Analysis Fractionation (CRYSTAF) an amorphous fraction soluble at a temperature below 30° C. of at most 10 wt % and a fraction crystallising between 60 to 75° C. of at least 35 wt % and
e) by temperature rising elution fractionation (TREF) analysis, at least 70 wt % of a crystallising polymer component having an elution temperature range from 60° C. to 94° C. and less than 10 wt % of a crystallising polymer component having an elution temperature range from 30° C. to 60° and,
f) by Gel Permeation chromatography coupled with Fourier transform infrared spectroscopy instruments (GPC-FTIR), a substantially constant short chain branching profile across the molecular weight distribution (MWD).

The linear low density polyethylene according to the invention is prepared by copolymerizing ethylene with one or more $C_4$-$C_{10}$-comonomer in the presence of a Ziegler-Natta catalyst composition comprising:
A) a procatalyst, which procatalyst comprises
  a) an Al compound having the formula Al(alkyl)$_x$Cl$_{3-x}$ (I), where alkyl is an alkyl group with 1 to 12 and $0 \leq x \leq 3$,
  b) a magnesium hydrocarbyloxy compound of formula Mg(OR$^1$)$_{2-n}$(R$^2$)$_n$ (II), wherein each R$^1$ and R$^2$ is independently a $C_{1-20}$ hydrocarbon residue which may optionally be substituted with halogen and $0 \leq n < 2$ and
  c) a chlorine-containing titanium compound of the formula Cl$_y$Ti(OR$^3$)$_{4-y}$ (III), wherein R$^3$ is a $C_{2-20}$ hydrocarbon residue and y is 1, 2, 3 or 4 and
  compounds a), b) and c) being deposited on a particulate inorganic support and
B) a halogenated aluminium alkyl cocatalyst of the formula (IV) ($C_1$-$C_4$-alkyl)$_m$-Al-X$_{3-m}$, wherein X is chlorine, bromine, iodine or fluorine and m is 1 or 2.

BRIEF DESCRIPTION OF THE DRAWINGS

FIG. 1 shows TREF curves of butene-ethylene-copolymers according to table 1 and 2 on page 26 of the specification produced after 37 min with TEAL compared to a TREF curve of copolymer produced after 30 min with TEAL/EADC.

FIG. 2 shows a TREF curve of a butene-ethylene-copolymer according to table 3 on page 27 and table 4 on page 28 of the specification produced after 90 min with DEAC.

FIG. 3a shows a GPC-FTIR curve of a butene-ethylene-copolymer according to table 1 on page 26 of the specification when TEA was used as a co-catalyst after 15 min polymerization.

FIG. 3b shows a GPC-FTIR curve of a butene-ethylene-copolymer according to table 3 on page 27 of the specification when DEAC was used as a co-catalyst after 15 min polymerization.

FIG. 4a shows a GPC-FTIR curve a butene-ethylene-copolymer according to table 1 on page 26 of the specification when TEA was used as a co-catalyst after 60 min polymerization.

FIG. 4b shows a GPC-FTIR curve a butene-ethylene-copolymer according to table 3 on page 27 of the specification when DEAC was used as a co-catalyst after 60 min polymerization.

FIG. 5a shows a Crystaf curve a butene-ethylene-copolymer according to table 1 on page 26 and table 5 on page 28 of the specification when TEA was used as a co-catalyst in 15 min polymerization.

FIG. 5b shows a Crystaf curve a butene-ethylene-copolymer according to table 1 on page 26 and table 5 on page 28 of the specification when TEA was used as a co-catalyst in 60 min polymerization.

FIG. 5c shows a Crystaf curve a butene-ethylene-copolymer according to table 3 on page 27 and table 5 on page 28 of the specification when DEAC was used as a co-catalyst in 15 min polymerization.

FIG. 5d shows a Crystaf curve a butene-ethylene-copolymer according to table 3 on page 27 and table 5 on page 28 of the specification when DEAC was used as a co-catalyst in 60 min polymerization.

FIG. 5e shows a Crystaf curve a butene-ethylene-copolymer according to table 3 on page 27 and table 5 on page 28 of the specification when DEAC was used as a co-catalyst in 180 min polymerization.

It has been found that this catalyst composition allows for the production of LLDPE with the above described "tailored" and "fine tuned" properties. In particular, the catalyst composition allows for the production of ethylene copolymers with improved properties such as an improved comonomer composition distribution, i.e. a more even comonomer composition respectively short chain branching distribution also in respect to polymerization time, as can be detected e.g. by TREF and GPC-FTIR analyzes and reduced lower fractions of very low-density ethylene copolymer.

Comonomer composition distribution (CCD) refers to the distribution of comonomer between copolymer molecules and the distribution of comonomer within each polymer molecule. According to the invention the CCD is evaluated with TREF and CRYSTAF Short chain branching distribution (SCBD) refers to the distribution of comonomer between different molecular weight polymer molecules. According to the invention the SCBD is evaluated with GPC-FTIR CCD respectively SCBD have both effects on polymer properties, like crystallinity, optical properties, toughness, melt processability and many other properties as well.

The polymers according to the invention show an improved CCD, respectively SCBD. As a consequence of the improved CCD, even with reasonable high comonomer contents a decreased amount of soluble fraction, determined by CRYSTAF (SF CRYSTAF), can be achieved. It should be noted that the above described catalyst composition allows for the production of ethylene copolymers or copolymer fractions of e.g. a multimodal polymer resin, with a comparatively narrow polydispersity index PDI.

Especially polydispersity index (PDI=Mw/Mn), comonomer composition distribution, short chain branching distribution and thus SF CRYSTAF, density and Mw are properties, which are tailored by using the above described catalyst composition. Furthermore these properties are stabilized during copolymerization, which means for example that the comonomer response respectively incorporation is more or less stable during the copolymerization process so that the comonomer composition distribution is not changed in the course of copolymerization. Also the molecular weight (or MFR) of the produced polymer is more or less constant during copolymerization.

The comonomer incorporation does furthermore not show a "time-drift" during the polymerization process which leads to a high degree of homogeneity of the produced ethylene copolymer.

The procatalyst (A) of the catalyst composition according to the invention comprises a reaction product (i) of a) an alkyl aluminium chloride, which is an internal soluble chlorination agent and which also has a co-catalytically impact, b) a soluble magnesium hydrocarbyloxy compound (named hereafter a magnesium complex) and c) a titanium compound which contains chlorine.

The catalyst components a), b) and c) are deposited on a suitable inorganic catalyst support to give said procatalyst A).

There are two possible ways for depositing the catalyst components on a suitable inorganic catalyst support, i.e. by sequentially contacting the support with the above mentioned compounds, as described in EP 0 688 794 or EP 0 835 887, or by first preparing a solution from the components a), b) and c) and then contacting the solution with a support, as described in WO 01/55230, all of which are herein fully incorporated by reference.

Variant I, according to EP 0 688 794 or EP 0 835 887, comprises the following steps:
- the inorganic support is contacted with the alkyl aluminium chloride a) to give a first reaction product,
- the first reaction product is contacted with the magnesium complex b) to give a second reaction product,
- the second reaction product is contacted with the titanium compound c) to give said procatalyst.

Variant II, according to WO 01/55230, comprises the following steps:
- reacting the magnesium complex b) with the alkyl aluminium chloride a) in a non polar hydrocarbon solvent in which said magnesium complex is soluble to produce a solution (A)
- contacting the solution (A) with the titanium compound c) to produce a solution (B) and
- contacting solution (B) with the inorganic support to give said procatalyst.

Preferably the procatalyst used according to the invention is prepared according to variant I.

The procatalyst used according to the invention comprises catalyst components a), b) and c).

Catalyst component a) is an aluminium compound of the formula $Al(alkyl)_xCl_{3-x}$ (I), wherein alkyl is an alkyl group of 1 to 12 C-atoms, preferably 1 to 8 C-atoms, more preferably 1 to 6 C-atoms and $0 \leq x \leq 3$, preferably x is 1 or 2. The alkyl group can be linear, branched or cyclic, or a mixture of such groups.

Suitable aluminium compounds are for example dimethyl aluminium chloride, diethyl aluminium chloride, diisobutyl aluminium chloride, ethyl aluminium dichloride, methyl aluminium dichloride and triethylaluminium or mixtures therefrom.

Preferably used as catalyst component a) are alkyl aluminium dichlorides, more preferably ethyl aluminium dichloride (EADC).

The magnesium complex b) of formula $Mg(OR^1)_{2-n}(R^2)_n$ (II) used in the procatalyst synthesis is totally soluble in non-polar hydrocarbon solvents.

In the formula (II) each $R^1$ and $R^2$ is independently a $C_{1-20}$ hydrocarbon residue, e.g. a $C_{2-15}$ group, preferably $C_{3-10}$ group, such as $C_{4-8}$ group, e.g. linear, cyclic or branched alkyl, aryl, aralkyl or alkaryl, suitably a linear or branched alkyl, preferably a branched alkyl, such as 2-ethyl-1-hexyl, or ethyl, propyl, butyl, pentyl, hexyl, heptyl, octyl, which may optionally be substituted with halogen and $0 \leq n < 2$.

Said magnesium complex may be commercially available or, preferably, can be prepared by reaction of a magnesium dihydrocarbyl (e.g. dialkyl) compound of the formula $Mg(R^2)_2$ wherein each $R^2$ is independently as defined above with an alcohol $R^{10}H$, wherein $R^1$ is as defined above.

Preferred magnesium dialkyl starting compounds include dibutyl magnesium, butyl ethyl magnesium or butyl octyl magnesium. More preferably butyl octyl magnesium (BOMAG) is used.

Suitable alcohols include octanol, hexanol, butanol, 2-ethyl-1-hexanol, 2-propyl-pentanol and 2-methyl-1-pentanol. More preferably 2-ethyl-1-hexanol is used.

The magnesium dialkyl/alcohol molar ratio is from 1:1 to 1:4, preferably from 1:1.5 to 1:3.5, more preferably from 1:1.7 to 1:2.0.

The reaction of the magnesium dialkyl and the alcohol may take place at any temperature but preferably takes place at a low temperature, e.g. 0-40° C., especially at room temperature.

Component c) is chlorine-containing titanium compound of the formula $Cl_yTi(OR^3)_{4-y}$ (III), wherein $R^3$ is a $C_{1-20}$ hydrocarbon residue, preferably a $C_{2-10}$ and more preferably a $C_{2-8}$ hydrocarbon residue. y is 1, 2, 3 or 4, preferably 3 or 4 and more preferably 4.

Suitable titanium compounds include trialkoxy titanium monochlorides, dialkoxy titanium dichloride, alkoxy titanium trichloride and titanium tetrachloride. Preferably titanium tetrachloride is used as component c).

In each preparation method, as described above, the components a), b) and d) may be added in molar ratios known in the art. Generally in the final solid procatalyst, the molar ratio of Mg:Ti can be e.g. between 10:1 to 1:10, preferably 5:1 to 1:1. The molar ratio of Ti:Al can be e.g. between 10:1 to 1:2, e.g. 3:1 to 1:1.

The particulate inorganic support (i) can be an inorganic oxide support, such as silica, alumina, titania, silica-alumina and silica-titania. Preferably, the support is silica.

The surface area, pore volume and particle size of the silica can be chosen according to the requirements of the specific polymerization process, in which the catalysts will be used. Typically, silica particles having a surface area in the range of from about 10 to about 700 m²/g (BET method), pore volume in the range of from about 0.1 to about 6.0 cm³/g and average particle size in the range of from about 10 to about 100 μm can be used. However, it has turned out that special advantages can be obtained if the support has an average particle size from 15 to 30 μm, preferably from 18 to 25 μm. The silica may be in granular, agglomerated, fumed or other form.

It is further preferred that the support material is calcinated, i.e. heat treated under air and then with a non-reactive gas such as nitrogen. This treatment is preferably done at a temperature in excess of 100° C., more preferably 200° C. or higher, e.g. 200-800° C., particularly about 600° C. The calcination treatment is preferably effected for several hours, e.g. 2 to 30 hours, more preferably about 10 hours.

Examples of suitable support materials, which are commercially available, are, for instance, ES747JR, produced and marketed by Ineos Silicas (former Crossfield), and SP9-491, Sylopol 55SJ, produced and marketed by Grace, etc.

A most preferred procatalyst A) is obtained by a process according to Variant I, as described in EP 0 688 794 or EP 0 835 887, using EADC as catalyst component a), a magnesium complex b) prepared by reacting BOMAG and 2-ethyl-1-hexanol, and titanium tetrachloride as component c), which are deposited on a silica support.

The second component of the Ziegler-Natta catalyst composition is the halogenated aluminium alkyl cocatalyst of formula (IV) $(C_1\text{-}C_4\text{-alkyl})_m\text{-Al}\text{—}X_{3-m}$, wherein X is chlorine, bromine, iodine or fluorine and m is 1 or 2.

The $C_1$-$C_4$-alkyl groups can be linear or branched or cyclic, or a mixture of such groups.

X is preferably chlorine or bromine, most preferably X is chlorine.

Suitable cocatalysts are for example dimethyl aluminium chloride (DMAC), diethyl aluminium chloride (DEAC), diisobutyl aluminium chloride (DIBAC), ethyl aluminium dichloride (EADC), methyl aluminium dichloride (MADC).

Preferred cocatalysts according to the invention are EADC or DEAC, which can be used in combination with triethyl aluminium (TEAL) or more preferably alone as a pure cocatalyst.

If EADC or DEAC are used in combination with TEAL the preferred molar ratio for halogenated aluminium alkyl:TEAL is from 5:95 to 95:5, preferably 10:90 to 90:10, more preferably 20:80 to 80:20, and most preferably 50:50. More preferably used are EADC in combination with TEAL (1:1 mixture) or DEAC alone. Most preferably used is pure DEAC.

The cocatalyst is typically used in excess to the transition metal of the transition metal compound. For instance, the molar ratio of the aluminium in the cocatalyst to the titanium in component c) is from 1 to 500 mol/mol, preferably from 2 to 100 mol/mol, more preferably from 5 to 50 mol/mol and in particular from 10 to 40 mol/mol.

The manner of combining the cocatalyst with the precursor is not critical to the present invention. Thus, the cocatalyst may be combined with the precursor either outside the reaction vessel prior to the polymerization reaction or it can be introduced into the reaction vessel substantially simultaneously with the precursor. Furthermore in multi—e.g. two-reactor systems it is also possible that the cocatalyst is only fed to the second reactor where the copolymerization is performed.

The Ziegler-Natta catalyst composition used according to the present invention, comprising a special procatalyst A) and a halogenated aluminium alkyl as cocatalyst B), shows an improved stability in regard to polymerization time compared to conventional Ziegler-Natta catalyst compositions.

Due to this improved stability a time dependent change of the behavior of the catalyst composition during the polymerization is avoided. The Ziegler-Natta catalyst composition shows almost no or little "time-drift" in the comonomer incorporation and therefore provides highly homogeneous LLDPE.

The LLDPE according to the invention is an ethylene copolymer of ethylene and one or more $C_4$-$C_{10}$-alpha olefin co-monomers.

The alpha-olefin comonomer units of the LLDPE resins are selected from $C_4$- to $C_{10}$-alpha-olefins, such as 1-butene, isobutene, 1-pentene, 1-hexene, 4-methyl-1-pentene, 1-heptene, 1-octene, 1-nonene and 1-decene and any mixtures thereof. Preferably, the comonomer is 1-butene and/or 1-hexene.

The comonomer content of the LLDPE can vary in wide ranges depending on the desired polymer properties. One benefit of the present invention is that due to the improved comonomer distribution reasonably high comonomer contents are possible without affecting some other properties, like SF CRYSTAF. I.e. the present invention really gives possibilities in tailoring the properties. Thus, the comonomer content can vary from low levels, as example from 1 wt % up to high amounts, like at least up to 16 wt. % or above. In addition, polymer with wide range of MFR can be produced, e.g. from $MFR_2$ from 0.1 to 2000 g/10 min to $MFR_{21}$ from 0.01 to 100 g/10 min. (190° C., 2.16 and 21 kg load, respectively).

The comonomer content is determined by FTIR.

Molecular weight information like Mw, Mn and PDI of the LLDPE according to the invention is obtained from GPC, whereas the short chain branching profile across the MWD is obtained from GPC-FTIR.

The LLDPE according to the invention has a density, according to ISO 1183, of from 900 to 925 kg/m$^3$ and a weight average molecular weight Mw determined by GPC of at least 200 000 g/mol, preferably at least 220 000 g/mol.

In addition an unimodal LLDPE according to the invention has a PDI determined by GPC, below 4, preferably below 3.7 and more preferably below 3.5.

The bulk density according to ASTM D1895-96 of the LLDPE according to the invention is above 200 kg/m$^3$, preferably above 250 kg/m$^3$, more preferably above 300 kg/m$^3$ and most preferably above 350 kg/m$^3$.

The invention relates to LLDPE having, in addition to the above described properties, by Crystallisation Analysis Fractionation (CRYSTAF) an amorphous fraction soluble at a temperature below 30° C. of at most 10 wt %, preferably at most 8 wt % and a fraction crystallising between 60 to 75° C. of at least 35 wt %, preferably at least 40 wt %.

In the CRYSTAF technique, a polymer is initially dissolved in an appropriate solvent at an increased temperature, then the temperature of solution is reduced very slowly resulting in gradual crystallization of the polymer. The concentration of the polymer remaining in solution is continuously monitored. The corresponding figure gives the rate of polymer precipitation, dW/dT, as a function of solution temperature T.

A CRYSTAF curve can be divided into several parts for easier interpretation. According to the present invention the curve was divided into four parts:
a) amorphous fraction: i.e. the polymer that is soluble at room temperature (below 30° C.$_{[s3]}$); the lower the soluble fraction, the better the CCD;
b) the HD-fraction between 75 and 90° C.;
c) a fraction between 30 to 60° C. and
d) a fraction between 60 and 75° C.; the larger this part, the better the CCD.

The LLDPEs according to the invention furthermore comprise, by temperature rising elution fractionation (TREF) analysis, at least 70 wt % of a crystallising polymer component having an elution temperature range from 60° C. to 94° and less than 10 wt % of a crystallising polymer component having an elution temperature range from 30° C. to 60°

TREF relies on the crystallization and redissolution process to separate polymers having differing levels of short-chain branching.

Characteristic comonomer composition profiles for Ziegler-Natta catalyzed LLDPEs are composed of three fractions. First, a soluble fraction elutes out at temperatures up to 60° C., which is heavily concentrated with comonomers (=very low density fraction). Secondly, a linear homo-polymer fraction (high density fraction) with little and/or no comonomers elutes out above 94° C. Thirdly, an in-between so-called "branched" fraction is made up of polymer molecules of various comonomer contents whose elution temperature covers the range from 60° C. to 94° C., which is the region characteristic for a good CCD.

A profile, evaluated by TREF, of a LLDPE according to the invention starts around 45° C. and finishes around 110° C.

The invention relates to LLDPE having, in addition to the above described properties, by Gel Permeation Chromatography coupled with Fourier transform infrared spectroscopy instruments (GPC-FTIR), a substantially constant short chain branching profile across the molecular weight distribution (MWD).

This short chain branching profile across the MWD can also be called comonomer content distribution profile across the molecular weight distribution (MWD).

The profile, evaluated by GPC-FTIR, of the LLDPEs according to the invention is substantially constant, respectively flat, meaning a "more or less" constant distribution of short chain branches per 1000 total carbons over the molecular weight distribution, i.e. each molecular weight fraction from the low molecular weight end to the high molecular weight end have "more or less" the same amount of short chain branches per 1000 total carbons.

In other words, the substantially constant respectively flat short chain branching profile across the molecular weight distribution (MWD), evaluated by GPC-FTIR, corresponds to a decrease of comonomer content, respectively short chain branches per 1000 total carbons as a function of molecular weight of 1 to at most 25%, i.e. the reduction of comonomer content, respectively short chain branches per 1000 total carbons over GPC-FTIR curve is less than 25%.

The GPC-FTIR method separates polymer molecules by their size and utilizes FTIR to measure the average methyl groups per 1000 total carbons, reflecting the comonomer content or short chain branching content within a narrow slice of the resin's MWD. Overall, this method generates a short chain branching profile, respectively comonomer distribution profile across the MWD of the resin.

The advantages of GPC-FTIR are described in detail by P. DesLauriers (DesLauriers, P. J., Measuring compositional heterogeneity in polyolefins using size-exclusion chromatography/Fourier transform infrared spectroscopy, In: Multiple Detection in Size-Exclusion Chromatography, American Chemical Society, pp. 210-229, 2005).

GPC-FTIR profiles of LLDPE produced with conventional Ziegler-Natta (ZN) catalysts show typically a clear decrease of short chain branches per 1000 total carbons, respectively of the comonomer content from low molecular weight to high molecular weight so that a downward profile is given.

In contrast thereto GPC-FTIR profiles of LLDPE according to the invention show a more flat respectively constant profile compared to state of the art ZN-catalyzed LLDPE. This means that there is a clearly less to almost no decrease of the short chain branches per 1000 total carbons, respectively comonomer content from low molecular weight to high molecular weight.

In a further embodiment the GPC-FTIR results in an upward short chain branches respectively comonomer content distribution profile across the MWD which stands for reverse comonomer incorporation, meaning that the short chain branches per 1000 total carbons respectively the comonomer content of the copolymer increases as the molecular weight of the polymer chains increases.

The LLDPE according to the invention is prepared, as already stated above, by copolymerizing ethylene and one or more $C_4$-$C_{10}$-alpha olefin comonomers in the presence of the special above described ZN-catalyst composition.

The copolymerization may be effected in a one-stage or multi-stage, preferably two-stage polymerization process. In such a multi-stage polymerization process the reactors are preferably connected in series such that the products of one reactor are used as the starting material in the next reactor.

The polymerization reactions used in each stage may involve conventional ethylene homo-polymerization or copolymerization reactions, e.g. gas phase, slurry phase, liquid phase polymerizations, using conventional reactors, e.g. loop reactors, gas phase reactors, batch reactors, e.t.c.

The polymerization may be carried out continuously or batch wise, preferably the polymerization is carried out continuously.

The polyethylene copolymer can further show unimodal, bimodal or multimodal molecular weight distribution.

Unimodal polymers can be produced in a one stage polymerization, although more then one stage is possible, but then polymers with approximately the same molecular weight are produced in each stage. Any type of polymerizations as listed above is possible.

Bimodal or multimodal polyethylene copolymers can be produced in dual or multi-stage and -reactor processes which are known in the art.

Different combinations for producing multimodal polymers can be used, e.g. gas-gas phase, slurry-slurry phase, slurry-gas phase processes; slurry-gas phase polymerization being a preferred one.

Multimodal polymers with respect to the molecular weight distribution (MWD) are produced in a multistage process, where lower molecular weight and higher molecular weight polymers (components) are produced in different polymerization steps, in any order.

If the lower molecular weight component is produced in the first stage and the higher molecular weight component thus being produced in the second step, this is called normal mode.

On the contrary, if the lower molecular weight component is produced in the second stage and the higher molecular weight component thus being produced in the first step, this is called reverse mode.

Preferably the process according to the invention is run in the normal mode.

More preferably the production of the lower molecular weight and higher molecular weight components is carried out as a combination of slurry polymerization for the lower molecular weight component and gas phase polymerization for the higher molecular component.

Thus the first stage is carried out in the slurry phase and produces preferably the lower molecular weight component. The second stage can be carried out in a gas phase or in a slurry phase, but is preferably carried out in the gas phase. Preferably the second stage produces the higher molecular weight component. In a preferred polymerization process one slurry phase stage is followed by one gas phase stage.

The slurry and gas stages may be carried out using any conventional reactors known in the art. A slurry phase polymerization may, for example, be carried out in a continuously stirred tank reactor; a batch-wise operating stirred tank reactor or a loop reactor. Preferably slurry phase polymerization is carried out in a loop reactor. In such reactors the slurry is circulated with a high velocity along a closed pipe by using a circulation pump. Loop reactors are generally known in the art and examples are given, for instance, in U.S. Pat. No. 4,582,816, U.S. Pat. No. 3,405,109, U.S. Pat. No. 3,324,093, EP-A-479186 and U.S. Pat. No. 5,391,654.

The term gas phase reactor encompasses any mechanically mixed, fluidized bed reactor, fast fluidized bed reactor or settled bed reactor or gas phase reactors having two separate zones, for instance one fluidized bed combined with one settled bed zone. Preferably the gas phase reactor for the second polymerization step is a fluidized bed reactor.

Optionally the process according to the invention can comprise one or two additional polymerization steps.

These optional one or two additional polymerization steps preferably comprise gas phase polymerization steps.

The reactor system may additionally comprise other reactors, e.g. for pre-polymerization. Pre-polymerization may be used, for example, to provide the catalyst in a solid particulate form or to activate the catalyst. In a typical pre-polymerization, monomer (e.g. ethylene) is polymerized with the catalyst system, as hereinbefore described, to yield, for example, 0.1 to 1000 g polymer per gram of catalyst. The polymer formed during pre-polymerization forms less than 10% by weight, preferably less than 7% by weight, typically less than 5% by weight of the total weight of the final polymer. Still more preferably only 2-3% of the total weight of the polymer is formed during any pre-polymerization step. A pre-polymerization is therefore not intended to represent one of the stages of the polymerization processes hereinbefore described.

A preferred multistage process for producing ethylene (co) polymers is a "loop-gas phase"-process, such as developed by Borealis (known as BORSTAR® technology) described e.g. in patent literature, such as in EP 0 517 868, EP 0 887 379.

For slurry reactors the polymerization medium typically comprises ethylene, optionally a comonomer, a diluent and a catalyst system as hereinbefore described. The diluent used will generally be an aliphatic hydrocarbon having a boiling point in the range −70 to +100° C. Preferred diluents include hydrocarbons such as propane, n-butane or isobutane, with propane as particularly preferred. Hydrogen is also preferably fed into the reactor to function as a molecular weight regulator. In a typical slurry phase polymerization the temperature is preferably in the range 40 to 110° C., preferably 60 to 100° C. and in particular 85 to 100° C.

The reaction pressure is typically 10 to 150 bar, preferably 15 to 100 bar.

In some cases it may be preferred to conduct the polymerization at a temperature which is higher than the critical temperature of the fluid mixture constituting the reaction phase and at a pressure which is higher than the critical pressure of said fluid mixture. Such reaction conditions are often referred to as "supercritical conditions". The phrase "supercritical fluid" is used to denote a fluid or fluid mixture at a temperature and pressure exceeding the critical temperature and pressure of said fluid or fluid mixture. When propane is used as a diluent an example of a suitable operating temperature is 95° C. and pressure 60 bar when employing supercritical conditions.

Polymerization in the first reactor (e.g. a loop reactor) is typically carried out for 10 to 300 minutes, preferably 20 to 120 minutes and the most preferably 30 to 90 minutes.

At least part of the volatile components of the reaction medium (e.g. hydrogen) may then be removed. The product stream is then subjected to a second polymerization stage.

The slurry may be withdrawn from the reactor either continuously or intermittently. A preferred way of intermittent withdrawal is the use of settling legs where the solids concentration of the slurry is allowed to increase before withdrawing a batch of the concentrated slurry from the reactor. The use of settling legs is disclosed, among others, in U.S. Pat. No. 3,374,211, U.S. Pat. No. 3,242,150 and EP-A-1310295. Continuous withdrawal is disclosed, among others, in EP-A-891990, EP-A-1415999, EP-A-1591460 and EP-A-1860125. The continuous withdrawal may be combined with a suitable concentration method, as disclosed in EP-A-1860125 and EP-A-1591460.

The second polymerization is preferably carried out using the same catalyst system as hereinbefore described in the first stage (i.e. no fresh catalyst is added in the second stage).

In the second polymerization stage for producing bimodal polyethylene copolymer preferably the higher molecular weight component of the polyethylene copolymer is produced. The second stage is preferably carried out in the gas phase. The polymer produced in the second stage is preferably a copolymer.

As gas phase reactors preferably fluidized bed gas phase reactors, fast fluidized bed gas phase reactors or settled bed gas phase reactors can be used.

In the process according to the invention preferably a fluidized bed gas phase reactors is used for the second polymerization step.

For gas phase reactors used according to the invention, the reaction temperature used will generally be in the range 60 to 115° C. (e.g. 70 to 110° C.), the reactor pressure will generally be in the range 10 to 30 bar, and the residence time will generally be 0.5 to 8 hours.

Preferably the residence time in the gas phase reactor is 1 to 4 hours, more preferably 1.5 to 3 hours.

The polymerization medium in the second stage typically comprises ethylene, comonomers (e.g. 1-butene, 1-hexene, or octene), nitrogen, propane and optionally hydrogen.

If the polymerization process comprises one or two additional polymerization steps, these steps are preferably performed in gas phase reactors, as described above. Any combination of gas phase reactors can be used.

For example, the polymerization product of the second polymerization step, which is either a fluidized bed polymerization step or a fast fluidized bed polymerization step, preferably a fluidized bed polymerization step is transferred into a third polymerization reactor, which is for example a settled bed polymerization reactor. The product from the third polymerization step is optionally transferred into a fourth reaction step, which uses for example again a fluidized bed polymerization reactor. From the fourth reaction reactor the polymer is recovered and sent to further processing.

The use of two or three subsequent fluidized bed polymerization reactors is a further possibility.

In any embodiment it is possible to feed additional procatalyst into any of the reaction zones respectively polymerization step. However, it is preferred that the solid procatalyst is introduced into the prepolymerization step only and that no fresh solid procatalyst is added into any reaction zone respectively polymerization step. Thus, the solid procatalyst entering a polymerization step comes from the preceding polymerization step(s) only. However, additional cocatalyst can be introduced into the reaction stages if necessary. This may be done, for instance, to increase the activity of the catalyst or to influence the isotacticity of the polymer.

Generally the quantity of catalyst composition used depends upon the nature of the catalyst composition, the reactor types and conditions and the properties desired for the polymer product.

The melt flow rate and the density as well as the molecular weight of the resulting ethylene copolymers can be controlled independently over wide ranges.

According to the invention highly homogeneous LLDPE with improved properties are provided, which readily can be used for a great variety of applications such as for example films, pipes, extrusion coating, flexible cables and the like.

1. DEFINITIONS AND MEASUREMENT METHODS

Melt Flow Rate

The melt flow rate (MFR) is determined according to ISO 1133 and is indicated in g/10 min. The MFR is an indication of the flowability, and hence the processability, of the polymer. The higher the melt flow rate, the lower the viscosity of the polymer and the molecular weight. The MFR is determined at 190° C. for polyethylene. It may be determined at different loadings such as 2.16 kg ($MFR_2$), 5 kg ($MFR_5$) or 21.6 kg ($MFR_{21}$).

GPC: Molecular Weight Averages, Molecular Weight Distribution, and Polydispersity Index (Mn, Mw, MWD, PDI)

Molecular weight averages (Mw, Mn), Molecular weight distribution (MWD) and its broadness, described by polydispersity index, PDI=Mw/Mn (wherein Mn is the number average molecular weight and Mw is the weight average molecular weight) were determined by Gel Permeation Chromatography (GPC) according to ISO 16014-4:2003 and ASTM D 6474-99. A Waters GPCV2000 instrument, equipped with differential refractive index detector and online viscosimeter was used with 2×GMHXL-HT and 1×G7000HXL-HT TSK-gel columns from Tosoh Bioscience and 1,2,4-trichlorobenzene (TCB, stabilized with 250 mg/L 2,6-Di tert butyl-4-methyl-phenol) as solvent at 140° C. and at a constant flow rate of 1 mL/min. 209.5 µL of sample solution were injected per analysis. The column set was calibrated using universal calibration (according to ISO 16014-2:2003) with at least 15 narrow MWD polystyrene (PS) standards in the range of 1 kg/mol to 12 000 kg/mol. Mark Houwink constants for PS, PE and PP used are as per ASTM D 6474-99. All samples were prepared by dissolving 0.5-4.0 mg of polymer in 4 mL (at 140° C.) of stabilized TCB (same as mobile phase) and keeping for max. 3 hours at max. 160° C. with continuous gentle shaking prior sampling in into the GPC instrument.

GPC-FTIR: Molecular Weight Distribution (MWD) and Short Chain Branching (SCB)

Molecular weight distribution (MWD) were determined by Gel Permeation Chromatography (GPC) according to ISO 16014-4:2003 and ASTM D 6474-99. A Waters GPC2000 instrument, equipped with heated flow cell (at 140° C.) connected via a heated transfer line (at 140° C.) was used with 2× Olexis and 1× Olexis Guard columns from Polymer Laboratories and 1,2,4-trichlorobenzene (TCB) as solvent at 140° C. and at a constant flow rate of 1 mL/min. The heated flow cell is mounted on a sample plate located in a Perkin Elmer Spectrum 100 equipped with a mercury cadmium telluride (MCT) detector. The MCT detector is cooled with liquid nitrogen. During the chromatographic run a series of FTIR spectra is collected using the Perkin Elmer TimeBase V3.0 software. The spectrometer settings were 16 accumulations, scan range from 3000 $cm^{-1}$ to 2700 $cm^{-1}$, resolution 8 cm-1. A background spectrum taken under GPC run conditions is substracted from each spectrum collected during the chromatographic run. 423.5 µL of sample solution were injected per analysis. The column set was calibrated using universal calibration (according to ISO 16014-2:2003) with at least 15 narrow MWD polystyrene (PS) standards in the range of 0.6 kg/mol to 6 000 kg/mol. Mark Houwink constants for PS, PE and PP used are as per ASTM D 6474-99. All samples were prepared by dissolving 4.0-8.0 mg of polymer in 4 mL (at 140° C.) of stabilized TCB (stabilized with 250 mg/L 2,6-Di tert butyl-4-methyl-phenol) and keeping for max. 3 hours at max 160° C. with continuously gentle shaking prior sampling into the GPC instrument. The spectral data as recorded by Perkin Elmer TimeBase 3.0 software is imported into Polymer Laboratories Cirrus V3.1 software and the evaluation towards molecular weights and molecular weight distribution was performed with this software.

The evaluation towards short chain branching was performed by applying a chemometric model using the Polymer Laboratories FTIR add on software for Cirrus. The model was generated as described in U.S. Pat. No. 6,632,680 and P. J. DesLauriers, D. C. Rohlfing, E. T. Hsieh; Polymer 2002, 43, 159-170. The short chain branching was determined as methyl branching per 1000 total carbons and was corrected for 2 methyl chain end groups per polymer chain as described in above mentioned reference.

Density was determined according to ISO 1183 on compression-moulded specimens.

Bulk density was determined according to ASTM D1895-96, method A, by filling a container with known volume (100 ml) with polymer powder and measuring the weight of polymer. Bulk density is calculated as $kgPE/m^3$.

CRYSTAF Determination Method:

The chemical composition distribution was determined by analytical Crystallisation Analysis Fractionation (CRYSTAF) as described in B. Monrabal; *Crystallization analysis fractionation: A new technique for the analysis of branching distribution in polyolefins*; Journal of Applied Polymer Science 1994, 52 (4), 491-499 and Soares, J. B. P., *Fractionation*, In: Encyclopedia Of Polymer Science and Technology, John Wiley & Sons, New York, pp. 75-131, Vol. 10, 2001. The separation of the polymer in CRYSTAF is according to crystallinity. The CRYSTAF profiles were generated using a CRYSTAF-TREF 200+ instrument manufactured by PolymerChar S.A. (Valencia, Spain). The experimental procedure was as follows:

In the dissolution step, the polymer sample was dissolved in 1,2,4-trichlorobenzene (TCB, stabilized with 300 mg/L 2,6-Di tert butyl-4-methyl-phenol) in one of the vessels at a concentration of 0.1 w/v % at 160° C. for 90 min. The sample solution was then rapidly cooled to 95° C. and held at 95° C. for 45 min for stabilization. The polymer sample was crystallized and precipitated in the vessel by a slow reduction of the temperature to 30° C. under a constant cooling rate (0.1° C./min). The concentration of polymers remaining in solution was determined by taking out 36 samples during the whole crystallisation process in constant time intervals using nitrogen overpressure. The concentration of the polymer being eluted was measured with an infrared detector (measuring the C—H absorption at 3.5 micrometer wavelength) and recorded together with the temperature in the vessel oven as a function of time. The concentration as obtained from IR detector resonses was plotted as a function of the temperature. The initial polymer concentration is assigned the 100% value and a pure solvent (TCB) is defined as 0% (cumulative CRYSTAF profile). The resulting curve was interpolated and derivated to obtain the CRYSTAF profile (dw/dT). The soluble fraction was calculated by extrapolation of the cumulative CRYSTAF profile to 30° C.

TREF Determination Method:

Fractionation of the polymer samples was achieved by using analytical Temperature Rising Elution Fractionation (TREF). The TREF profiles were generated using a home made instrument, which is similar to a published design (L. Wild, T. R. Ryle, D. C. Knobeloch, I. R. Peat; J. Polym. Sci. Polym. Phys. 1982, 20, 441).

The sample was dissolved in 1,2,4-trichlorobenzene (TCB, 2 to 4 mg/mL, stabilized with 250 mg/L 2,6-Di tert butyl-4-methyl-phenol) at 145° C. for 4 hours and 2.5 mL sample solution was injected into the column (8 mm inner diameter, 15 cm length, filled with Chromosorb P 60/80) at 135° C., and the latter was then cooled to 20° C. at a constant cooling rate of 4.08° C./h. The polymer was subsequently eluted from the column with 1,2,4-trichlorobenzene (stabilized with 250 mg/L 2,6-Di tert butyl-4-methyl-phenol) at a flow rate of 1 mL/min at 20° C. for a period of 10 min followed by a temperature increase from 20° C. to 135° C. at a constant heating rate of 0.8° C./min. The output during the heating phase was detected with an infrared detector (Foxboro Miran 1A CVF) operating at a wavelength of 3.46 µm and presented as a fractogram normalised to constant area.

Comonomer content of the obtained products was measured in a known manner based on Fourier transform infrared spectroscopy (FTIR) calibrated with $^{13}$C-NMR, using Nicolet Magna 550 IR spectrometer together with Nicolet Omnic FTIR software.[s4]

Films having a thickness of about 220 to 250 µm were compression moulded from the samples. Similar films were made from calibration samples having a known content of the comonomer. The thicknesses were measured from at least five points of the film. The films were then rubbed with sandpaper to eliminate reflections. The films were not touched by plain hand to avoid contamination. For each sample and calibration sample at least two films were prepared. The films were pressed from pellets by using a Graceby Specac film press at 150° C. using 3+2 minutes preheating time, 1 minute compression time and 4 to 5 minutes cooling time. For very high molecular weight samples the preheating time may be prolonged or the temperature increased.

The comonomer content was determined from the absorbance at the wave number of approximately 1378 cm$^{-1}$. The comonomer used in the calibration samples was the same as the comonomer present in the samples. The analysis was performed by using the resolution of 2 cm$^{-1}$, wave number span of from 4000 to 400 cm$^{-1}$ and the number of sweeps of 128. At least two spectra were run from each film.

The comonomer content was determined from the spectrum from the wave number range of from 1430 to 1100 cm$^{-1}$. The absorbance is measured as the height of the peak by selecting the so-called short or long base line or both. The short base line is drawn in about 1410-1320 cm$^{-1}$ through the minimum points and the long base line about between 1410 and 1220 cm$^{-1}$. Calibrations need to be done specifically for each base line type. Also, the comonomer content of the unknown sample needs to be within the range of the comonomer contents of the calibration samples.

Elemental Analysis of the Catalysts

The elemental analysis of the catalysts was performed by taking a solid sample of mass, M, cooling over dry ice. Samples were diluted up to a known volume, Vol, by dissolving in nitric acid (HNO$_3$, 65%, 5% of Vol) and freshly deionised (DI) water (95% of Vol), the samples were left to stabilize for two hours. The analysis was run at room temperature using a Thermo Elemental IRIS Advantage XUV Inductively Coupled Plasma—Atomic Excitation Spectrometer (ICP-AES) which was calibrated immediately before analysis using a blank (a solution of 5% HNO$_3$ in DI water), a low standard (10 ppm Al in a solution of 5% HNO$_3$ in DI water, a high standard (100 ppm Mg, 50 ppm Al, 50 ppm Ti in a solution of 5% HNO$_3$ in DI water) and a quality control sample (50 ppm Mg, 20 ppm Al, 20 ppm Ti and in a solution of 5% HNO$_3$ in DI water).

The content of aluminium was monitored via the 167.081 nm line, when Al concentration in ICP sample was between 0-10 ppm and via the 396.152 nm line for Al concentrations between 10-100 ppm. The magnesium concentration was monitored via the 285.213 nm line and the titanium content via the 323.452 nm line.

The reported values, required to be between 0 and 100, or further dilution is required, are an average of three successive aliquots taken from the same sample and are related back to the original catalyst using equation 1.

$$C = (R \times \text{Vol})/M \qquad \text{Equation 1}$$

Where: C is the concentration in ppm, related to % content by a factor of 10,000, R is the reported value from the ICP-AES, Vol is the total volume of dilution in ml, M is the original mass of sample in g.

If dilution was required then this also needs to be taken into account by multiplication of C by then dilution factor.

2. PREPARATION OF THE CATALYST a) Preparation of Mg Complex 87 kg of toluene was added into a multi purpose reactor. Then 45.5 kg Bomag A (20% solution in heptane) were added to the reactor. 161 kg 99.8% 2-ethyl-1-hexanol (2-EHA) were then introduced into the reactor at a flow rate of 24-40 kg/h. 2-EHA had been earlier dried with molecular sieves. The reaction temperature was kept below 38° C. The solution was mixed for 30 minutes and cooled to room temperature.

The molar ratio between BOMAG-A and 2-ethyl-1-hexanol was 1:1.83.

b) Solid Catalyst Component Preparation:

275 kg silica (ES747JR of Crossfield, having average particle size of 20 µm) activated at 600° C. in nitrogen were charged into a catalyst preparation reactor. Then 411 kg 20% EADC (2.0 mmol/g silica) diluted in 555 liters pentane were added into the reactor at ambient temperature during one hour. The temperature was then increased to 35° C. while stirring the treated silica for one hour. The silica was dried at 50° C. for 8.5 hours. Then 655 kg of the complex prepared as described above (2 mmol Mg/g silica) were added at 23° C. during ten minutes. 86 kg pentane were added into the reactor at 22° C. during ten minutes. The slurry was stirred for 8 hours at 50° C. Finally 52 kg TiCl$_4$ were added during 0.5 hours at 45° C. The slurry was stirred at 40° C. for five hours. The catalyst was then dried by purging with nitrogen.

Catalyst composition was: 3.1 wt % of Al, 2.3 wt % of Mg, 2.3 wt % of Ti and 14.1 wt % of Cl.

3. COPOLYMERIZATION OF ETHYLENE AND 1-BUTENE

Polymerizations were carried out in 3 l stainless steel autoclave reactor equipped with a stirrer and continuous supply of ethylene.

1800 ml of i-butane were added into the reactor at room temperature as reaction medium. The temperature was then increased to 85° C. The procatalyst and the co-catalyst were fed into the reactor by means of two feed vessels that were connected in line to the reactor lid. About 75-100 mg of the procatalyst was added into the upper feed vessel together with 10 ml (6.3 g, 87 mmol) of pentane. An appropriate amount of the co-catalyst, i.e. TEAL, 1:1 mixture of TEAL/EADC or DEAC was added to the lower feed vessel. An Al/Ti molar ratio of 15 was used in the co-polymerization with TEA and with the mixed co-catalyst and about 30 with the DEAC co-catalyst. The co-catalyst was first let into the reactor and the procatalyst was after that introduced by pressurising the upper feed vessel to 30 bar with $N_2$ and there after letting the over pressure push in the catalyst in to the reactor. This manoeuvre was done three times. Two additional feed vessels were connected in series between the lid of the reactor and the ethylene monomer feed line. 150 ml (89.3 g, 1.59 mol) of butene ($C_4"$) co-monomer were introduced into the lower feed vessel. 2 bar of $H_2$ pressure was added to the upper 500 ml feed vessel (44.6 mmol). The polymerization was started by opening the monomer feed line and thereby introducing both the co-monomer and the $H_2$ together with the ethylene monomer. Partial pressure of added ethylene was varied pending on the amount of hydrogen added. A pressure of about 22.5 bar was maintained by the ethylene feed trough out the test polymerization. The co-polymerization was carried out at 85° C. The co-polymerization was continued for 15, 30 respectively 37, 60 or 90 or even 165 min. The polymerization was stopped by venting off the monomer and the iso-butane.

4. POLYMERIZATION RESULTS AND POLYMER ANALYSIS

MFR and bulk density were measured from the co-polymers. Mw, Mn and PDI were measured by GPC and the $C_4"$% in the co-polymer was measured by FTIR as disclosed above. The soluble fraction was measured with CRYSTAF. In addition the density was measured from all the co-polymers using known methods. The co-monomer distribution was described by temperature rising elution fractionation (TREF). GPC-FTIR was used to evaluate the short chain branching distribution profile.

Table 1 shows the butene-co-polymerization results with the procatalyst prepared as described under point 2a) and 2b) in a time test series with TEAL or a 1:1 TEAL/EADC mixture as co-catalyst.

produced either with the TEA/EADC mixed co-catalyst or with the DEAC co-catalyst were sticky. These polymers showed a quite good bulk density of 390 kg/m³.

Characterization by TREF Curves

TREF curves of the butene-co-polymers produced with the procatalyst and the TEAL/EADC mixed co-catalyst were compared to TREF curves of the co-polymer achieved with TEAL as co-catalyst by integrating the elution areas according to elution temperature (Table 2)

TABLE 2

| Polymerization time (min) | cocatalyst | Fraction 30-60° C. [wt %] | Fraction 60-94° C. [wt %] | Fraction >94° C. [wt %] | wt % butene |
|---|---|---|---|---|---|
| 15 | TEAL | 17 | 68.6 | 14.4 | 9.0 |
| 37 | TEAL | 18.1 | 63.5 | 18.4 | 6.7 |
| 60 | TEAL | 10 | 66 | 24 | 6.5 |
| 15 | TEAL/EADC | 9.9 | 76.3 | 13.8 | 6.6 |
| 30 | TEAL/EADC | 1.9 | 77.5 | 20.6 | 5.6 |
| 60 | TEAL/EADC | 7.4 | 72.7 | 19.8 | 5.2 |
| 90 | TEAL/EADC | 4.5 | 76.8 | 18.7 | 4.8 |

The measured results show clearly that there was a decrease in the short chained co-monomer fraction (very low density fraction) eluted between 30-60° C. and a corresponding increase in the co-monomer fraction eluted between 60-94° C. which is the region characteristic for a good CCD when the mixed cocatalyst was used.

FIG. 1 shows the TREF curves of the copolymer produced after 37 min with TEAL as cocatalyst compared to the copolymer produced after 30 min with TEAL/EADC as cocatalyst. The TREF curve of the copolymers produced with the mixed co-catalyst show less material of the short chained

TABLE 1

| Time | 15 mins. | 37 min. | 60 mins. | 15 mins. | 30 min | 60 mins. | 90 min |
|---|---|---|---|---|---|---|---|
| Cocatalyst | TEAL | TEAL | TEAL | TEAL/EADC | TEAL/EADC | TEAL/EADC | TEAL/EADC |
| MFR(21) | 101.7 | 46.1 | 28.8 | 2.6 | 2 | 4.6 | 2.4 |
| BD, kg/m3 | sticky | sticky | sticky | 260 | 345 | 390 | 390 |
| $C_4"$ Cont., wt % | 9 | 6.7 | 6.5 | 6.6 | 5.6 | 5.2 | 4.8 |
| GPC Mw | 93 000 | 111 000 | 127 000 | 229 000 | 246 000 | 191 000 | 223 000 |
| GPC Mn | 20 900 | 29 200 | 32 800 | 67 500 | 75 400 | 56 600 | 69 300 |
| PDI | 4.5 | 3.8 | 3.9 | 3.4 | 3.3 | 3.4 | 3.2 |
| Density kg/m3 | 916.8 | 921.5 | 922.4 | 915.7 | 916.1 | 918.7 | 918 |
| Crystaf | See FIG. 5a | — | See FIG. 5b | — | — | — | — |

The results from Table 1 show that a substantially higher Mw and Mn could be achieved when using the mixed TEA/EADC co-catalyst compared to when using the TEA co-catalyst alone. The Mw became the double, from 110 000 g/mol to about 220 000 g/mol. The MFR results confirmed the change in Mw as the MFR values were about ten times higher when using the TEA co-catalyst compared to when using the mixed TEA/EADC co-catalyst. In addition there was almost no change in the Mw and Mn values in respect of time when using the mixed TEA/EADC co-catalyst.

All the copolymers produced with the TEA co-catalyst were sticky, so sticky indeed that bulk density measurements became uncertain. Contrary to this, none of the copolymers co-monomer rich fraction to the left in the curves, and a higher fraction of co-polymer in the middle of the TREF curves compared to the material produced with TEAL.

Comonomer Incorporation and Density

The results in Table 1 show that there was only a slight decrease in comonomer incorporation by time when using the mixed co-catalyst, namely from 6.6% down to 4.8% in 90 min, and a corresponding increase in density from 915.7 kg/m³ to 918 kg/m³. That is an increase in density of 2.3 kg/m³. The corresponding changes, when using the TEA co-catalyst were from 9% down to 6.5% in 60 min, and a corresponding increase in density from 916.8 kg/m³ to 922.4 kg/m³. That is an increase in density of 5.6 kg/m³. The results show thereby, that there was a density drift by time when using the TEA co-catalyst that is over double as fast as when using a mixed co-catalyst.

In Table 3 the results from the co-polymerizations with DEAC as co-catalyst are shown.

TABLE 3

Cocatalyst DEAC

| Polymerization time | 15 mins. | 60 mins. | 90 mins. | 180 mins. |
|---|---|---|---|---|
| MFR(21) | 2.3 | 2.3 | 2.8 | 2.4 |
| BD, kg/m3 | 310 | 435 | 445 | 475 |
| 1-butene, Cont., wt % | 6.4 | 5.1 | 5 | 4.7 |
| GPC Mw | 235 000 | 226 000 | 222 000 | 224 000 |
| GPC Mn | 70 500 | 72 200 | 68 100 | 72 200 |
| PDI | 3.3 | 3.1 | 3.1 | 3.1 |
| Density, kg/m3 | 916.1 | 917.6 | 917.4 | 919.3 |
| Crystaf | See FIG. 5c | See FIG. 5d | | See FIG. 5e |

The Mw and Mn results from the copolymers produced with the DEAC co-catalyst shown in Table 3 are in total agreement with the results achieved with the mixed TEA/EADC co-catalyst. Mw and Mn were roughly twice as big compared to the values achieved from co-polymers created with the TEA co-catalyst. No "time drift" in Mw nor in Mn could be seen. PDI was narrow, being between 3,3-3,2 with a slightly decreasing trend by time.

Comonomer Incorporation and Density

The comonomer incorporation results from the copolymers produced with the DEAC co-catalyst shown in Table 3 are in total agreement with the results achieved with the mixed TEA/EADC co-catalyst. Both result series started at about 6.5% in a 15 min run and showed a slight decrease by time so that in a 90 min run about 5% of co-monomer is still incorporated.

TABLE 4

TREF results with DEAC co-catalyst

| Polymerization time (min) | Fraction 20-60° C. [wt %] | Fraction 60-94° C. [wt %] | Fraction >94° C. [wt %] | wt % Butene |
|---|---|---|---|---|
| 15 | 9.6 | 72 | 18.4 | 6.4 |
| 60 | 4.5 | 75.1 | 20.4 | 5.1 |
| 90 | 4.7 | 74.9 | 20.4 | 5.0 |

FIG. 2 shows the comonomer distribution measured by TREF for the copolymerization of butene and ethylene with DEAC as cocatalyst after 90 min.

With CRYSTAF, also amorphous polymer phase was measured. We can see, that DEAC improved comonomer incorporation into fraction 60-75° C. whereby the amount was rather constant during polymerization. When the amorphous phase (<30° C.) is studied, we can see that its amount was clearly lower compared to TEA in all polymerisation times.

TABLE 5

CRYSTAF results with TEA and DEAC as cocatalysts

| | Fraction (amorphous) <30° C. [wt %] | Fraction 30-60° C. [wt %] | Fraction 60-75° C. [wt %] | Fraction 75-90° C. [wt %] |
|---|---|---|---|---|
| DEAC 180 min | 2.5 | 15 | 40.5 | 42 |
| DEAC 60 min | 5 | 15 | 45 | 35 |
| DEAC 15 min | 7.5 | 17.5 | 42.5 | 32.5 |
| TEA 60 min | 12 | 18 | 27.5 | 42.5 |
| TEA 15 min | 17.5 | 27.5 | 30 | 25 |

In FIGS. 3a and 3b the GPC-FTIR results for the copolymerization of butene and ethylene with TEA or DEAC as cocatalyst after 15 min are shown.

From these GPC-FTIR results it can be clearly seen, that when TEA was used as a cocatalyst (3a) the short chain branches/1000 total carbons are varying from 30 down to 15 short chain branches/1000 carbons (50% decrease) indicating very inhomogeneous comonomer composition distribution as a function of molecular weight. Most comonomer tended to go to low molecular weight part, that is not favourable in many polymer applications. Situation changed drastically when DEAC (3b) was used as a cocatalyst. Short chain branches/1000 total carbons are varying ONLY from 18 down to 14 short chain branches/1000 total carbons (22% decrease) indicating very homogeneous comonomer composition distribution as a function of molecular weight.

In FIGS. 4a and 4b the GPC-FTIR results for the copolymerization of butene and ethylene with TEA or DEAC as cocatalyst after 60 min are shown.

After 60 min polymerisation, there was still clear decrease in comonomer incorporation as a function of molecular weight with TEA. When DEAC was used the comonomer incorporation looked very stabile indicating very similar comonomer content in all molecular weight fractions In FIGS. 5a, 5b, 5c and 5d CRYSTAF results for polymers obtainable from the copolymerisation of butane and ethylene with TEA and DEAC as co-catalysts are shown. By using CRYSTAF, the amorphous phase and crystalline phase of the polymer can be studied. The amount of amorphous phase can be seen at the beginning of the curve as a bar indicating the amount of amorphous (=non-crystalline) polymer that is very soluble and very often contains very high amounts of comonomer. Comparing FIGS. 5a (=TEA cocatalyst) and 5c (=DEAC cocatalyst) in 15 min polymerisation, it can be clearly seen, that the amount of amorphous polymer fraction was considerably lower when DEAC was used. Additionally, it can be seen that the amount of polymer fraction coming out at 60-75° C. was clearly higher in case of DEAC indicating also improved comonomer composition distribution. Similar trends can be seen also in 60 min polymerisation when FIGS. 5b (TEA) and 5d (DEAC) curves are compared. There it can be seen again that the amount of amorphous polymer fraction was further reduced with DEAC compared to corresponding test with TEA. Additionally, similar improved (=more narrow) co-monomer composition distribution and relatively smaller fraction of higher crystallinity polymer fraction with DEAC can be seen.

The invention claimed is:

1. Ziegler-Natta catalyzed linear low density polyethylene which satisfies the following conditions:
   (a) a density, according to ISO 1183, of from 900 to 925 kg/m$^3$,
   (b) a $C_4$-$C_{10}$-comonomer content, determined by Fourier transform infrared spectroscopy, of 1 to 16 wt %

(c) a weight average molecular weight Mw, determined by gel permeation chromatography, of at least 200 000 g/mol,
(d) wherein the linear low density polyethylene comprises, by Crystallisation Analysis Fractionation (CRYSTAF) an amorphous fraction soluble at a temperature below 30° C. of at most 10 wt % and a fraction crystallising between 60 to 75° C. of at least 35 wt % and
(e) by temperature rising elution fractionation (TREF) analysis, at least 70 wt % of a crystallising polymer component having an elution temperature range from 60° C. to 94° C. and less than 10 wt % of a crystallising polymer component having an elution temperature range from 30° C. to 60° and,
(f) by gel permeation chromatography coupled with Fourier transform infrared spectroscopy instruments (GPC-FTIR), a substantially constant distribution of short chain branches per 1000 total carbon atoms across the molecular weight distribution (MWD).

2. Ziegler-Natta catalyzed linear low density polyethylene which satisfies the following conditions:
(a) a density, according to ISO 1183, of from 900 to 925 kg/m$^3$,
(b) a $C_4$-$C_{10}$-comonomer content, determined by Fourier transform infrared spectroscopy, of 1 to 16 wt %
(c) a weight average molecular weight Mw, determined by gel permeation chromatography, of at least 200 000 g/mol,
(d) wherein the linear low density polyethylene comprises, by Crystallisation Analysis Fractionation (CRYSTAF) an amorphous fraction soluble at a temperature below 30° C. of at most 10 wt % and a fraction crystallising between 60 to 75° C. of at least 35 wt % and
(e) by temperature rising elution fractionation (TREF) analysis, at least 70 wt % of a crystallising polymer component having an elution temperature range from 60° C. to 94° C. and less than 10 wt % of a crystallising polymer component having an elution temperature range from 30° C. to 60° and,
(f) by Gel Permeation chromatography coupled with Fourier transform infrared spectroscopy instruments (GPC-FTIR), a reverse short chain branching profile across the molecular weight distribution (MWD), wherein the amount of short chain branches per 1000 total carbon atoms of the copolymer increases as the molecular weight of the polymer chains increases.

3. Linear low density polyethylene according to claim 1 or 2, wherein the linear low density polyethylene has a bulk density according to ASTM D1895-96, method A, of above 200 kg/m$^3$.

4. Linear low density polyethylene according to claim 1 or 2, wherein the linear low density polyethylene has polydispersity index PDI, determined by GPC, of below 4.

5. Linear low density polyethylene according to claim 1, wherein the substantially constant short chain branching profile across the molecular weight distribution (MWD), evaluated by GPC-FTIR, corresponds to a decrease of short chain branches per 1000 backbone carbons as a function of molecular weight of 1 to at most 25%.

6. Linear low density polyethylene according to claim 1 or 2, which is prepared by copolymerizing ethylene and one or more $C_4$-$C_{10}$-comonomer in the presence of a Ziegler-Natta catalyst composition comprising:
(A) a procatalyst, which procatalyst comprises:
(a) an Al compound having the formula Al(alkyl)$_x$Cl$_{3-x}$ (I), where alkyl is an alkyl group with 1 to 12 carbon atoms and $0 \leq x \leq 3$,
(b) a magnesium hydrocarbyloxy compound of formula Mg(OR$^1$)$_{2-n}$(R$^2$)$_n$ (II), wherein each R$^1$ and R$^2$ is independently a $C_{1-20}$ hydrocarbon residue which may optionally be substituted with halogen and $0 \leq n < 2$, and
(c) a chlorine-containing titanium compound of the formula Cl$_y$Ti(OR$^3$)$_{4-y}$ (III), wherein R$^3$ is a $C_{2-20}$ hydrocarbon residue and y is 1, 2, 3, or 4,
compounds (a), (b), and (c) being supported on a particulate inorganic carrier, and
(B) a halogenated aluminum alkyl cocatalyst of the formula (IV) (C$_1$-C$_4$-alkyl)$_m$-Al—X$_{3-m}$, wherein X is chlorine, bromine, iodine, or fluorine, and m is 1 or 2,
the LLDPE showing, by GPC-FTIR, a substantially constant or reverse distribution of short chain branches per 1000 total carbon atoms across the molecular weight distribution (MWD) compared to LLDPE produced without using a halogenated cocatalyst.

7. Linear low density polyethylene according to claim 6, wherein the halogenated aluminum alkyl cocatalyst of the formula (IV) is selected from the group consisting of dimethyl aluminum chloride, diethyl aluminum chloride, diisobutyl aluminum chloride, ethyl aluminum dichloride and methyl aluminum dichloride.

8. Linear low density polyethylene according to claim 7, wherein ethyl aluminum dichloride or diethyl aluminum chloride are used alone as cocatalyst or in combination with triethyl aluminum in a molar ratio for halogenated aluminum alkyl:TEAL is from 10:90 to 90:10.

9. Linear low density polyethylene according to claim 6, wherein the procatalyst is obtained by
contacting said inorganic support with the alkyl aluminum chloride a) to give a first reaction product,
contacting said first reaction product with the magnesium complex b) to give a second reaction product and
contacting said second reaction product with the titanium compound c) to give said procatalyst.

10. Linear low density polyethylene according to claim 3, wherein the procatalyst is obtained by
reacting the magnesium complex b) with the alkyl aluminum chloride a) in a non-polar hydrocarbon solvent in which said magnesium complex is soluble to produce a solution (A)
contacting said solution (A) with the titanium compound c) to produce a solution (B) and
contacting said solution (B) with said inorganic support to give said procatalyst.

11. Linear low density polyethylene according to claim 6, wherein the procatalyst is composed of ethyl aluminum dichloride as catalyst component a), a magnesium complex b) prepared by reacting butyl octyl magnesium and 2-ethyl-1-hexanol, and titanium tetrachloride as component c), which are deposited on a silica support.

* * * * *